United States Patent [19]

Martin

[11] 4,108,462
[45] Aug. 22, 1978

[54] BICYCLE SEAT AND MOUNTING THEREFOR

[76] Inventor: Lee D. Martin, 2321 E. Murdock, Wichita, Kans. 67214

[21] Appl. No.: 767,734

[22] Filed: Feb. 11, 1977

[51] Int. Cl.² ............................................. B62J 1/00
[52] U.S. Cl. ............................... 280/289 E; 248/286; 248/429; 297/195
[58] Field of Search ............... 280/289 R, 289 E, 202; 297/195, 203, 408, 409; 248/286, 429

[56] References Cited

U.S. PATENT DOCUMENTS

| 2,251,592 | 8/1941 | Lowe | 248/286 |
| 2,476,226 | 7/1949 | Schwinn | 297/195 |
| 2,877,875 | 3/1959 | Bolt | 248/286 |
| 3,501,119 | 3/1970 | Rich, Jr. | 297/195 |
| 3,758,154 | 9/1973 | Kitaguchi | 297/203 |

Primary Examiner—Joseph F. Peters, Jr.
Assistant Examiner—Donn McGiehan
Attorney, Agent, or Firm—Robert E. Breidenthal

[57] ABSTRACT

A bicycle seat mounting wherein a connector is interposed between the post clamp and the bicycle seat, such connector being linearly adjustable in its position relative to the seat, and releasably retained in adjusted relation by a nut and bolt combination. The connector is pivotally secured to the post clamp by another nut and bolt combination that can be tightened to both actuate the clamp and to prevent relative pivotal movement.

8 Claims, 5 Drawing Figures

BICYCLE SEAT AND MOUNTING THEREFOR

The present invention relates to new and useful improvements in bicycle seats and more particularly pertains to the structure mounting the seat upon the bicycle to afford greater flexibility and ease of adjustment of the relative position and attitude of the seat.

Although the conventional bicycle seat of the type having a relatively wide rear portion for accommodating the rump and a central forwardly projecting portion adapted to accommodate and support the crotch portion of the rider has enjoyed wide use in the past, it has been found to have substantial shortcomongs insofar as some styles of riding that are becoming increasingly popular are concerned.

Such styles of riding referred to above are those wherein the rider is more disposed to rest his weight upon the pedals through his legs and feet than upon the seat through his rump.

Furthermore, such styles of riding are those wherein the rider tends to thrust forwardly upon the handle bar through his arms and to press, primarily rearwardly, against the seat with his rump region, when the seat is used, it being noted that such styles of riding often entails the rider moving entirely clear of the seat for a sustained interval — perhaps the entire time he pedals.

Such styles of riding have involved the discovery that apprehensions on the part of male riders that seat support in the crotch region is necessary to avoid injury to or pain caused by private parts coming into inadvertent contact with the bicycle frame intermediate the steering post and the seat are largely if not entirely unwarranted.

Such discovery makes it clear that seat construction inclusive of a crotch support is not only unnecessary but that such crotch support interferes with free rider pedaling movement unless the seat is tilted forward to an extent inconsistent with any such support function. In actual fact the crotch support appears to constitute the greatest hazard of the character alluded to above.

Such styles of riding wherein the seat serves primarily as a backstop during coasting rather than a vertical support carries with it a need for greater flexibility of adjustment as to seat height and particularly of the forward tilt of the seat.

Accordingly, an important purpose of the present invention is to provide a seat that is well suited for styles of riding stressed above particularly in being devoid of a crotch support together with means affording an optimized flexibility of adjustment as to forward seat tilt and vertical position.

Another important purpose is to provide a bicycle seat mounting such as to afford independent linear and tilting adjustments.

Still another important aim is to provide a seat and adjusting capability as outlined above that are durable and easy to use, and which can be employed to replace the seat and mountings of extant bicycles.

A broad aspect of the invention involves apparatus for mounting a bicycle seat upon the seat support post of a bicycle comprising a mounting bracket adapted to be secured to a bicycle seat, a connector secured to the bracket for linear movement relative thereto, means for releasably securing the connector to the bracket in a selected relative position, a clamp means adapted to clampingly engage a bicycle post, said clamp means being pivotally carried by the connector, and a common means for securing the clamp means in a selected pivotal relation to the connector and for actuating the clamp means.

Another broad aspect of the invention involves, in a bicycle of the type wherein a seat is mounted on a post carried by the bicycle frame, an improved means for mounting the seat on the post comprising a channel-shaped bracket fixed to the seat, said channel-shaped bracket including a planar web connecting a pair of flanges that extend from the seat, said flanges having elongated slots therein that are substantially parallel to the web of the bracket, a U-shaped connector comprising a pair of legs joined by a web, said connector being received in the channel-shaped bracket with the web and legs thereof respectively in sliding engagement with the web and the flanges of the bracket, said legs having a pair of aligned openings, a threaded securing means extending through the aligned openings and the slots for releasably securing the connector and the bracket against relative movement, a U-shaped clamp having a bight portion slidably embracing the bicycle post and a pair of legs disposed between the legs of the connector at a position spaced from the bracket in an arrangement such that flexure of the legs of the connector toward each other forces the clamp to clamp upon and frictionally engage the post, the legs of the connector and the legs of the clamp having aligned openings therethrough, and a threaded means extending through the aligned openings of the legs for urging closing flexure of the legs of the connector on being tightened in an arrangement such that the same constitutes a pivotal connection between the clamp and the connector when loosened to loosen the clamp on the post.

The invention, its objects, features and advantages will be best appreciated in the light of the following description of a preferred embodiment of the same, such being given in conjunction with the accompanying drawings, wherein.

Figure 1:
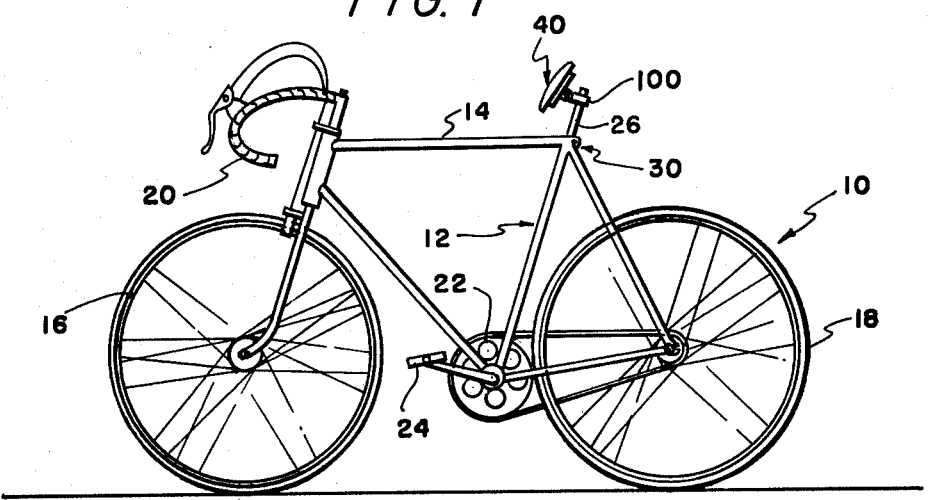
FIG. 1 is a side elevational view of a conventional ten-speed bicycle equipped with a seat and mounting therefor in accordance with the instant invention.

Referring now to the drawings wherein like numerals designate like parts throughout the various views, the reference numeral 10 designates a bicycle generally, the same conventionally including a frame 12 inclusive of an upper member 14, forward and rear wheels 16 and 18, and handle bars 20. The bicycle also conventionally includes means for rider propulsion inclusive of a sprocket 22 provided with crank mounted pedals such as the one indicated at 24.

Conventionally, the frame 12 includes a telescoping element 26 or seat mounting post adjustable in position along the direction of its longitudinal, primarily vertical, extent. Conventional means designated generally at 30 of C-type clamp character is provided to secure the post 26 at desired adjusted positions, such means 30 involving the frame 12 being split at the position of telescoping emergence of the seat post 26 therefrom and a threaded nut and bolt for adjustably tightening the split portion of the frame 12 on the post 26.

The bicycle 10 as thus far described is entirely conventional and it is to be understood, as should become abundantly clear to those conversant with the art, that the instant invention is not limited to the particular type of bicycle illustrated, but can be practiced in connection with any kind of riding vehicle which customarily utilizes seats similar to those of extant bicycles and the like and has a post analogous to the post 26.

Proceeding now to the seat of the instant invention and its mounting upon the solid cylindrical post 26, the seat is designated generally at 40 and comprises a sturdy rectangular plate or base 42 which can be constituted of any suitable hardwood, synthetic resin or plastic, or metal as shown by cross hatching in the drawings. Padding 44, which, for example, can be foamed resilient material or felt, is disposed on the top side of the base 42 and the padding is covered by a sheet of flexible covering material 46, with the latter having its peripheral margins folded about the end and side edges of the base 42 and bonded or otherwise securely attached by any suitable adhesive to the peripheral margin of the base 42 as shown at 48. The sheet 46 can be of leather or any suitable synthetic resin. The latter is well suited, especially such as is commercially available upon a fabric backing integral therewith as such backing contributes to the strength of the covering and contributes to the security of attachment of the cover 46 to the bottom margins of the base 42 by epoxy resins or the like.

Means is provided for adjustably mounting the seat 40 on the post 26, and such means comprises a preferably metallic channel member 50 constituted of a web 52 joining flanges 54 and 56. The web 52 is seated flush against the bottom side 58 of the seat base 42 and is fixedly secured thereto in any suitable manner such as by spot welding 60. As the length of the member 50 is nearly the width of the base 42, the covering material 46 is cut away, as at 62, to the extent necessary to accommodate flush seating of the web 52 against the plate 42.

The medial plane of the seat 40 coincides with the minor or width dimension of the seat 40 and the longitudinal dimension or extent of the member 50 lies in such medial plane.

A U-shaped metallic connector 64 comprised of a web 66 connecting the legs 68 and 70 is received in the member 50 with the webs 52 and 66 in sliding engagement. Also the legs 68 and 70 are respectively in sliding engagement with the flanges 54 and 56 while projecting downwardly therefrom. The legs 68 and 70 have a pair of elongated slots 74 in the flanges 54 and 56. A threaded bolt 80 having a head 82 extends through the openings 72 and the slots 74. The length of the bolt 80 is parallel to the major dimension of the seat 40. A washer 84 is disposed on the bolt 80 intermediate the head 82 and flange 54, and a similar washer 86 is interposed on the bolt 80 intermediate the flange 56 and a wing nut 88 threaded on the free threaded end 90 of the bolt 80. A spacing sleeve 92 is also disposed on the bolt 80 intermediate the flanges 54 and 56.

The structure described above is such that the planar webs 52 and 66 are maintained in flush arrangement at all times with the connector 64 being afforded a freedom of sliding movement parallel to the bottom of the seat base 42 limited by the length of the slots 74. At any position along the length of such adjustment freedom, the connector 64 can be releasably secured against movement relative to the seat 40 by finger tightening of the nut 88 on the bolt 80. The resilience and flexibility of the flanges 54 and 56 are such as to enable such clamping or securing action, and are such as to release the connector 64 for subsequent readjustment on loosening of the nut 88. The length of the spacing sleeve 92 is such as to preclude any substantial flexure of the legs 68 and 70 that might be otherwise caused by tightening of the wing nut 88.

A C-shaped post clamp 100 is provided which is comprised of a bight portion 102 adapted to embrace the post 26, such bight portion 102 terminating in a pair of spaced legs 104 and 106.

The legs 104 and 106, which preferably are formed with inturned arcuate flanges 108 and 110 as shown, are received between the free ends of the connector legs 68 and 70 at a position spaced below the channel 50. The legs of the clamp 100 are provided with a pair of aligned openings 116 and the leg 70 of the connector 64 is provided with a similar opening 118 in alignment therewith. The leg 68 of the connector 64 is provided with an opening 120 in alignment with the openings 116 and 118, however, the opening 120 is noncircular so as to nonrotatably receive a short and square shank portion 122 of a carriage bolt 124 that is passed through the openings 116, 118 and 120 in an arrangement such that the headed end 126 thereof bears against the connector leg 68. A wing nut 130 is threaded upon the free threaded end 132 of the bolt 124 and a washer 134 is interposed between the nut 130 and the leg 70. Preferably the opposing faces of the legs 68 and 70 and the outer faces of the legs 104 and 106 are provided with sets of radial serrations as indicated at 140 and 142, respectively.

The arrangement is such that when the nut 130 is loosened, the clamp 100 can pivot relative to the connector 64 about an axis parallel to the bolt 80 with the bolt 124 serving as the pivot pin, it being noted that the bolts 80 and 124 are parallel. When the nut 130 is tightened, the serrated faces of the legs 68 and 70 are forced to bear against the serrated faces of the legs 104 and 106 of the clamp 100 which effects two results, namely, the clamp 100 is caused to frictionally clamp and lock upon the post 26, and the clamp 100 is frictionally engaged by the connector 64 to secure the same against pivotal movement relative thereto. The connector 64 and the clamp 100 are of sufficient flexibility and resiliency to loosen the clamp 100 upon the post 26 and to restore pivotal adjustment freedom of the clamp 100 upon loosening of the nut 130.

The manner of use of the apparatus described above will be readily understood.

Figure 2:
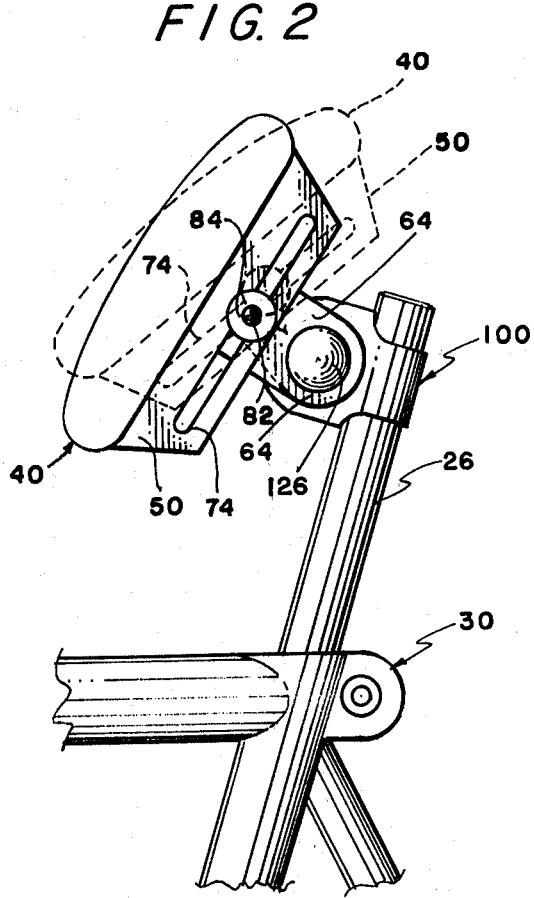
FIG. 2 is an enlarged side elevational view of the seat and its mounting on a fragmentarily illustrated bicycle post, with alternative positions of the seat being shown in dashed outline.
Figure 3:
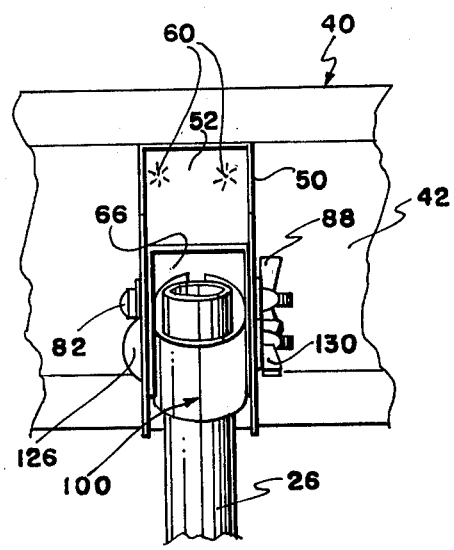
FIG. 3 is a rear view of the structure shown in FIG. 2 with portions of the seat being broken away.
Figure 4:
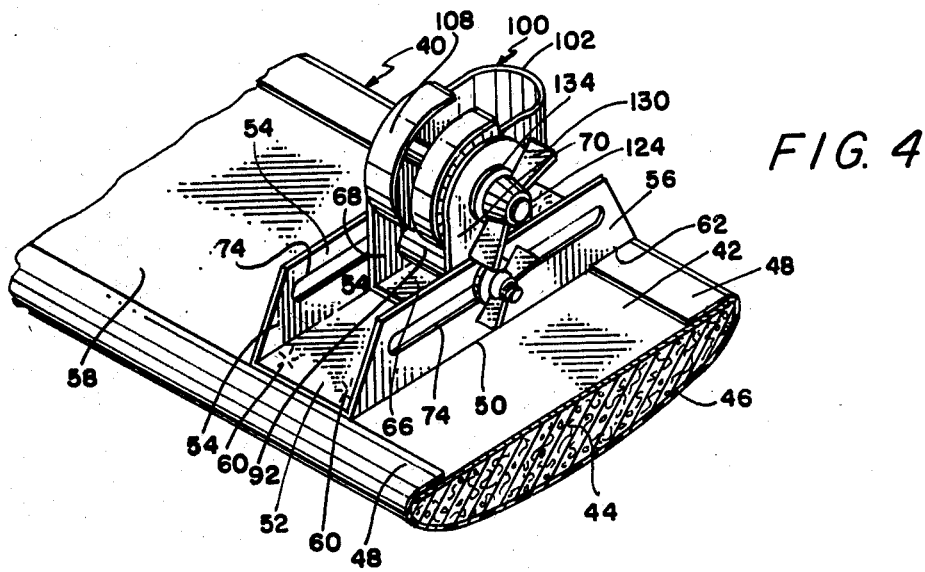
FIG. 4 is an isometric view of the seat and its mounting in an inverted position, with parts of the seat being broken away and shown in section; and, FIG. 5 is an exploded assembly view of the mounting means.
Figure 5:
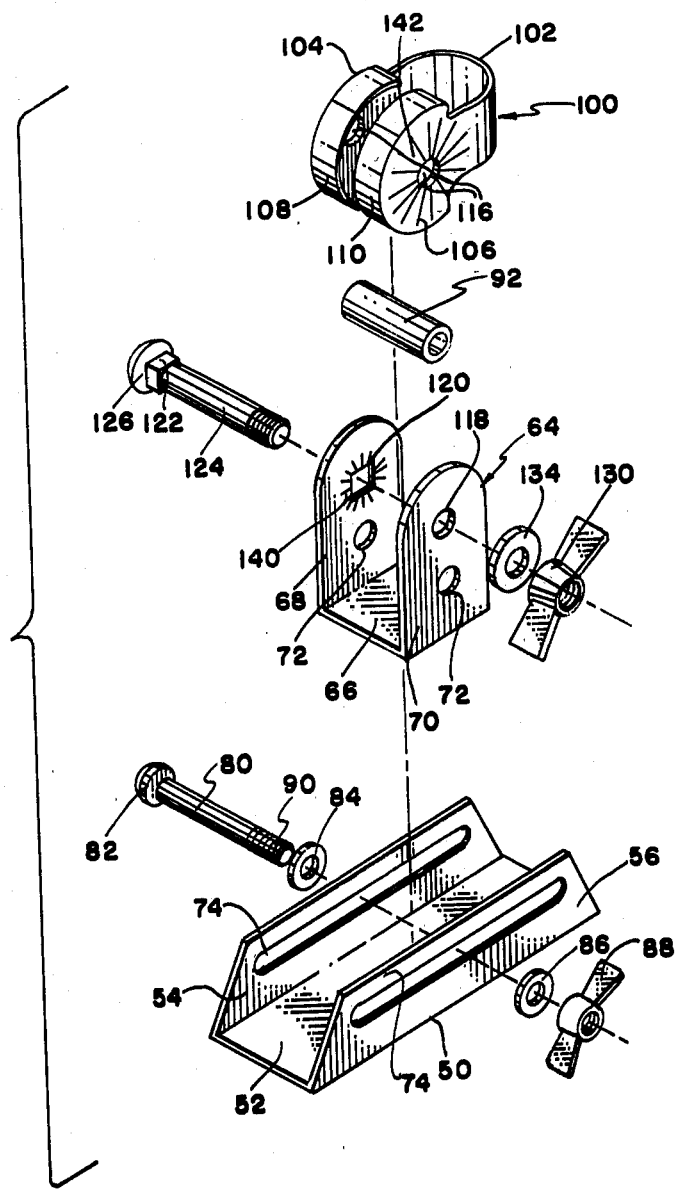

The wing nut 130 can be loosened to enable a tilt adjustment of the seat 40 as, for example, between the full and dashed line positions shown thereof in FIG. 2. When such tilt adjustment is made, the clamp 100 can be positioned on the post 26 as desired. This adjustment, or adjustments as the case may be, can be made prior to or after or in any event independent of such adjustment as may be effected by loosening of the nut 88. Loosening of the nut 88 enables the seat 40 to be adjusted in the plane of the seat 40 in the direction of the slots 74 that is limited by the length of the latter.

The order of making adjustments is of course a matter of personal preference, however, it is most commonly preferred to first set the tilt (using the nut 130) as well as the position of the clamp 100 on the post 26, it being assumed the bolt 80 is initially centered in the slots 74.

Final touch-up then being effected by use of the nut 88 and the slots 74. With adjustment thus initially effected, it has been found that adjustment to suit other riders often can be effected by only touching-up with the nut 88 and slots 74 being involved. In any event the independence of the adjustments simplifies adjustment notwithstanding the greater range and flexibility of possible relative positions of the seat 40 and bicycle frame 12 realizable.

It is noted that loads applied normal to the seat 40 are normal also to the slots 74, and as a consequence the nut 88 does not have to be greatly tightened to avoid inadvertent misadjustment.

Needless to say, the described apparatus is fully compatible with conventional posts 26 that are of bent character rather than the straight one shown.

Attention is now directed to the appended claims for an appreciation of the scope of the invention.

I claim:

1. Apparatus for mounting a bicycle seat upon the seat support post of a bicycle comprising a mounting bracket adapted to be secured to a bicycle seat, a connector secured to the bracket for linear movement relative thereto, means for releasably securing the connector to the bracket in a selected relative position, a clamp means adapted to clampingly engage a bicycle post, said clamp means being pivotally carried by the connector, and a common means for securing the clamp means in a selected pivotal relation to the connector and for actuating the clamp means, said bracket being a channel member comprised of a web connecting a pair of flanges, said flanges having a pair of elongated slots therein, said connector being slidably and guidingly received between the flanges of the bracket, with said means for releasably securing the connector to the bracket comprising threaded means engaging the connector and extending through the slots.

2. The combination of claim 1, wherein the connector is U-shaped and includes a web connecting a pair of legs, said webs each being planar and in sliding engagement with each other, said legs having a pair of aligned openings, and said threaded means including a bolt extending through said aligned openings and said slots.

3. The combination of claim 2, wherein said clamping means comprises a U-shaped clamp that includes a pair of legs joined by a bight portion, such bight portion being adapted to embrace a bicycle post, said pair of legs of the clamp being received between the pair of legs of the connector at a position spaced from the bracket, all the legs of the pairs thereof having aligned openings therethrough, said common means including a threaded bolt means extending through the aligned openings for urging flexing movement of the legs of the connector toward each other and to cause them to bear against the legs of the clamp.

4. In a bicycle of the type wherein a seat is mounted on a post carried by the bicycle frame, an improved means for mounting the seat on the post comprising a channel-shaped bracket fixed to the seat, said channel-shaped bracket including a planar web connecting a pair of flanges that extend from the seat, said flanges having elongated slots therein that are substantially parallel to the web of the bracket, a U-shaped connector comprising a pair of legs joined by a web, said connector being received in the channel-shaped bracket with the web and legs thereof respectively in sliding engagement with the web and the flanges of the bracket, said legs having a pair of aligned openings, a threaded securing means extending through the aligned openings and the slots for releasably securing the connector and the bracket against relative movement, a U-shaped clamp having a bight portion slidably embracing the bicycle post and a pair of legs disposed between the legs of the connector at a position spaced from the bracket in an arrangement such that flexure of the legs of the connector toward each other forces the clamp to clamp upon and frictionally engage the post, the legs of the connector and the legs of the clamp having aligned openings therethrough, and a threaded means extending through the aligned openings of the legs for urging closing flexure of the legs of the connector on being tightened in an arrangement such that the same constitutes a pivotal connection between the clamp and the connector when loosened to loosen the clamp on the post.

5. The combination of claim 4, wherein said last recited threaded means includes a bolt extending through said openings and a nut threaded on the bolt, and said bolt being secured against rotation relative to the bracket.

6. The combination of claim 5, wherein the seat is substantially of parallelepiped configuration and has a top and bottom, said bracket being secured to the seat with its web disposed against the bottom of the seat, said relative movement of the connector with respect to the bracket being parallel to the bottom of the seat and transverse to the major dimension of the seat.

7. The combination of claim 5, wherein the bolt extends in a direction normal to the direction of relative movement of the connector and the bracket.

8. The combination of claim 7, wherein the seat is substantially of parallelepiped configuration and has a top and bottom, said bracket being secured to the seat with its web disposed against the bottom of the seat, said relative movement of the connector with respect to the bracket being parallel to the bottom of the seat and transverse to the major dimension of the seat.

* * * * *